United States Patent

Kawamura et al.

Patent Number: 5,913,086
Date of Patent: Jun. 15, 1999

[54] SETTING OF CONTROL INFORMATION CHANGING APPARATUS

[75] Inventors: Koichiro Kawamura, Ichihara; Masahiro Suzuki, Chiba, both of Japan

[73] Assignee: Nikon Corporation, Tokyo, Japan

[21] Appl. No.: 08/958,332

[22] Filed: Oct. 27, 1997

Related U.S. Application Data

[63] Continuation of application No. 08/516,107, Aug. 17, 1995, abandoned.

[30] Foreign Application Priority Data

Feb. 14, 1995 [JP] Japan .................................. 7-025590

[51] Int. Cl.⁶ .................................................. G03B 17/00
[52] U.S. Cl. ........................................... 396/223; 396/299
[58] Field of Search ..................................... 396/297, 299, 396/213, 223, 238, 239, 242, 243, 245

[56] References Cited

U.S. PATENT DOCUMENTS 5,189,466  2/1993  Yasukawa et al. ..................... 396/299
5,233,888  8/1993  Fukahori ................................ 396/222

FOREIGN PATENT DOCUMENTS 2-210424  8/1990  Japan .

OTHER PUBLICATIONS

Abstract of JP-A-2-210424, Aug. 21, 1990.
Abstract of JP-A-7-104339, Apr. 21, 1995.

*Primary Examiner*—Safet Metjahic
*Assistant Examiner*—J. K. Han
*Attorney, Agent, or Firm*—Oliff & Berridge, PLC

[57] ABSTRACT

A setting of control information changing apparatus having first and second operational components, a setting change device, and a switching device. The setting change device changes the setting of the first control information, for example, in response to the independent operation of the first operational component, and changes the setting of the second control information in response to simultaneous operation of both of the first and the second operational components. The switching device switches the operation of the setting change device between a possible condition in which the setting change of the first control information is possible and an impossible condition in which the setting change of the first control information is not possible. When the setting change device is in the impossible condition, the first control information is not changed if the first operational component is in operation, while the second control information can be changed by the simultaneous operation of the first and the second operational components. Therefore, changing operation of the undesirable control information is certainly prohibited.

19 Claims, 7 Drawing Sheets

SETTING OF CONTROL INFORMATION CHANGING APPARATUS

This is a Continuation of application Ser. No. 08/516,107 filed Aug. 17, 1995 now abandoned.

BACKGROUND OF THE INVENTION

1. Field of the Invention

The present invention relates to an information setting apparatus for setting photographic information of a camera or the like.

2. Description of the Related Art

In cameras or electronic still cameras, there are various control information, such as shutter speed, diaphragm stop values, exposure mode, and the like, the settings of which can be changed by the photographer. In recent years, the setting of the various types of control information in cameras has been changed by electrically detecting the rotational amount and the direction of rotation of an operation dial. However, to faciliate the operational of the dial, the operational force of the dial is set to be relatively small. Therefore, if the photographer inadvertently touches the operation dial, he may change the setting of the control information without intending to do so. The effects may be extreme if, contrary to the intentions of the photographer, the shutter speed or the diaphragm values are changed. The effects may prevent a high quality picture from being taken or prevent a picture from being taken at all while the setting is changing to the adequate value. Therefore, a camera has been presented in which, a switch is provided to select a valid mode or an invalid mode for the information setting operation using the operation dial and when an invalid mode is selected, the setting change cannot be made by the operation dial (As disclosed, for example, in Japanese Laid Open Patent Publication Heisei 2-210424.).

With the camera described above, in some cases, setting changes relating to a plurality of control information can be accomplished by means of a single operation dial. For example, the setting is changed in response to the single operation of the operation dial for control information that must often be changed. Such control information include shutter speed and diaphragm value. For control information that do not need to be changed often, the setting is changed in response to the related operation for example simultaneous operation of the operational component and the operation dial. Information that do not require frequent resetting include such information as the exposure mode and the photometric range. In the latter case, if all of the setting changes of various control information by the operation dial are uniformly prohibited in response to the selection of an invalid mode for prohibiting the setting change only, one specific control information (such as shutter speed) can not be changed and and all other control information are also prohibited from being changed, the result is a decline in operational deterioration. In the system described above, first types of control information are switched when the operation dial is operated independently, and second types of control information are switched when the operation dial is operated in connection with other operational components. As a result, only one type of the control data is changed, even if the operations dial is touched inadvertently, and the other type of control data will not be changed.

SUMMARY OF THE INVENTION

A purpose of the present invention is to provide an information setting apparatus with superior operational capability relating to the setting change operation of the control information.

The present invention achieves the purpose described above and others by employing an information setting apparatus equipped with a first operational component and a second operational component that is different from the first operational component. A setting change device changes the setting of first control information in response to the independent operation of the first operational component, and changes the setting of second control information, which is different from the first control information, in response to a specified related operation of the first operational component and the second operational component. A switching device can switch the operation of the setting change device between a condition in which the setting change is possible and a condition in which the setting change is not possible. The setting change device is able to target the setting change only of the first control information.

BRIEF DESCRIPTION OF THE DRAWINGS

The present invention will be described in detail with reference to the following drawings in which like reference numerals refer to like elements and wherein.

DETAILED DESCRIPTION OF THE PREFERRED EMBODIMENTS

Embodiments of the present invention are provided hereafter, as applied to an electronic still camera, with reference to FIGS. 1 through 7.

First Embodiment

Figure 1:
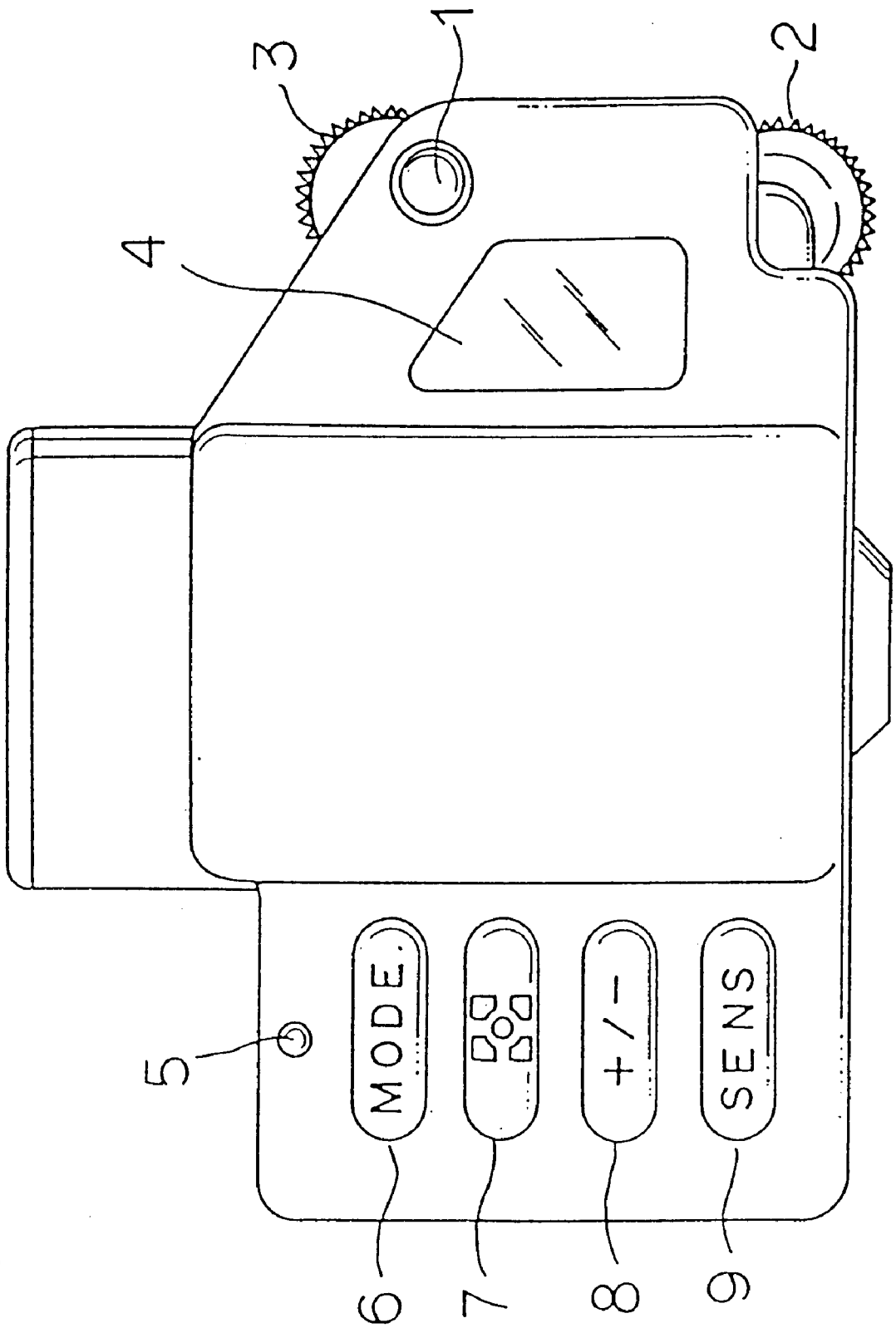
FIG. 1 is an upper surface diagram of a camera related to a first embodiment according to the present invention.
Figure 2:
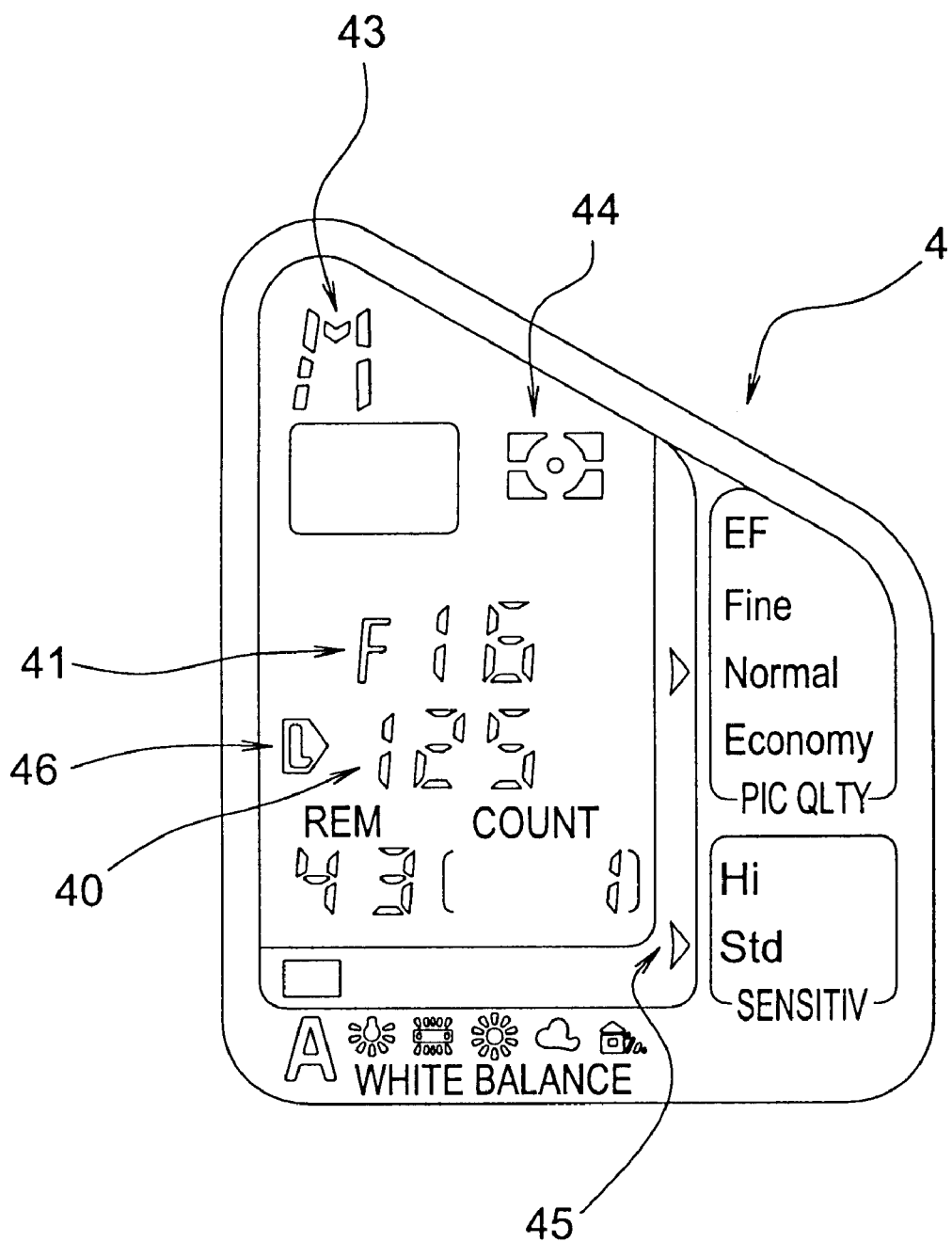
FIG. 2 is a diagram showing a display example of an LCD display panel of the camera shown in FIG. 1.

FIG. 1 is an upper surface diagram of a camera related to a first embodiment according to the present invention. On the upper surface of the camera are located a release button 1, a command dial 2, a sub-command dial 3 and an LCD display panel 4 respectively. When only the command dial 2 is rotated, the setting of the shutter speed is changed. When only the sub-command dial 3 is rotated, the setting of diaphragm value is changed. As shown in FIG. 2, the settings of the shutter speed and the diaphragm value are displayed on the shutter speed display segment 40 and the diaphragm display segment 41 of the LCD display panel 4.

As shown in FIG. 1, a lock button 5, an exposure mode button 6, a photometric mode button 7, an exposure compensation button 8 and a sensitivity switch button 9 are located on the upper surface of the camera. The lock button 5 is used together with the command dial 2 to carry out the function of selecting the valid mode, which allows the setting change, and the invalid mode, which prohibits changing the setting of the data by the command dial 2.

If the command dial 2 is rotated while one of the buttons 6 through 9 is pushed, the setting conditions of the function designated by one of the buttons 6 through 9 are changed in accordance with the operation of the command dial 2. For example, at the time when the exposure mode button 6 is operated, the exposure mode is changed to the program automatic exposure mode (P mode), the shutter speed priority exposure mode (S mode), the diaphragm priority exposure mode (A mode) or the manual exposure mode (M mode) in due order. Similarly, the photometric range changes with the operation of the command dial 2 when the photometric mode button 7 is operated, the exposure compensation quantity changes with the operation of the command dial 2 when the exposure correction button 8 is operated, and the sensitivity of the photographic element (not shown) changes with operation of the command dial 2 when the sensitivity switching button 9 is operated.

As shown in FIG. 2, the setting conditions of the exposure mode, photometric range and the sensitivity are displayed by the exposure mode display segment 43, the photometric range display segment 44 and the sensitivity display segment 45 of the LCD display panel 4 respectively. The numerical code 46 is a lock display segment that displays whether the setting change of the shutter speed is possible or not. When the setting change of the shutter speed cannot be effected by the operational of the command dial 2 because the invalid mode is selected by the lock button 5 described above, the lock mark, shown in the figure, is displayed by the lock display segment 46 adjoining the shutter speed display segment 41.

Figure 3:
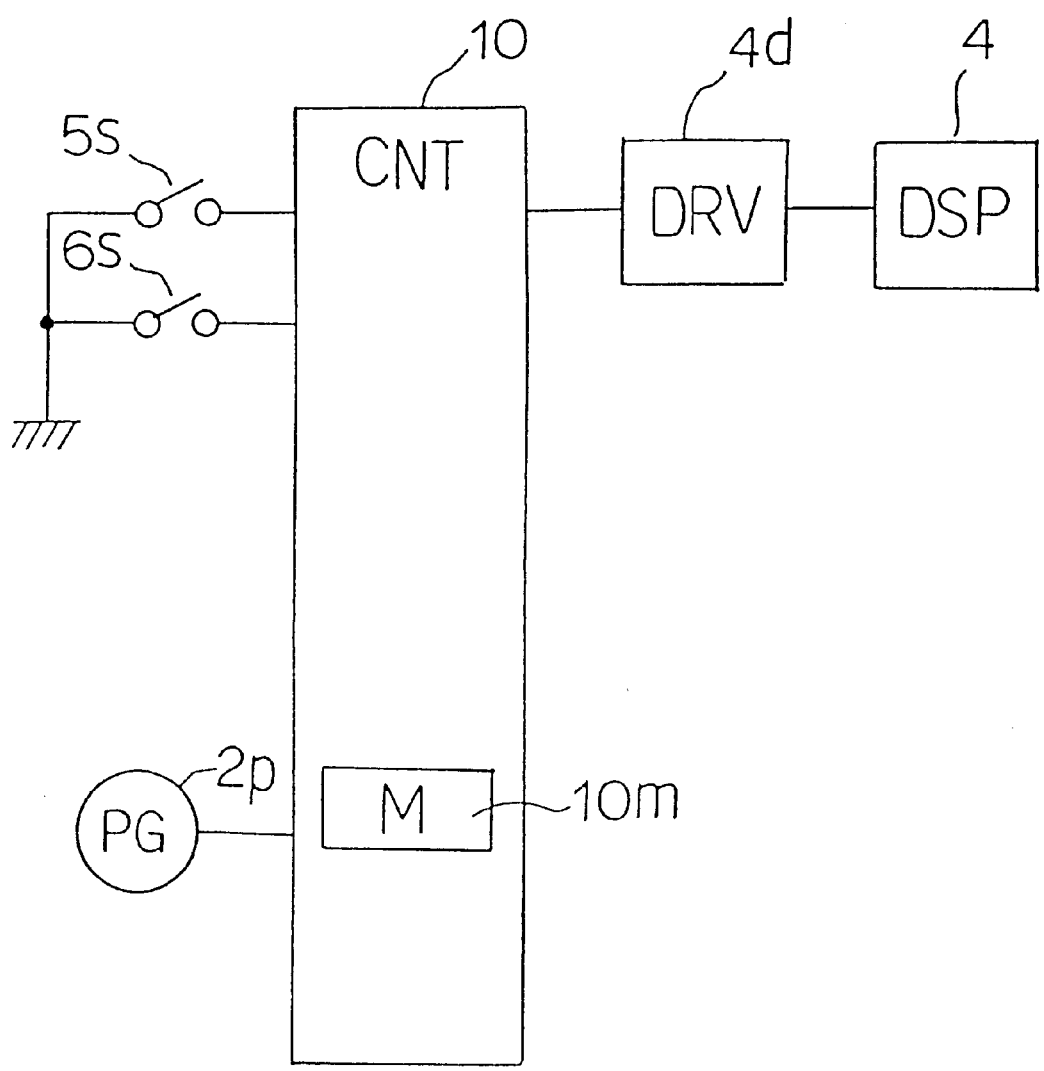
FIG. 3 is a block diagram showing parts within the control system of a camera concerned with the present invention shown in FIG. 1.

FIG. 3 is a block diagram showing the structure of the present invention and its relation to the control system of the camera. Controller 10 in the figure is composed of a microcomputer and peripheral components such as a memory 10m. The controller 10 accomplishes the various types of sequence control and the calculation control of the camera. A pulse generator 2p, which generates the pulse signals in accordance with the rotation direction and rotation quantity of the command dial 2, a switch 5s, which is turned ON in response to the push-in operation of the lock button 5, and a switch 6s, which is turned ON in response to the depression of the exposure mode button 6 are connected to the controller 10. The LCD display panel 4 is connected via a driver 4d. In addition, the command dial 2 is a click type command dial. The pulse generator 2p generates one pulse when the command dial 2 is rotated one click. The controller 10 accomplishes the setting changes of the various types of information and the display control of the LCD display panel 4, in accordance with the single operation of the command dial 2 or the sub-command dial 3 described above, or through the connected operation with the buttons 6 through 9.

In the illustrated embodiment, the camera controller is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 4–7 can be used as the controller. As shown, a distributed processing architecture is preferred for maximum data/signal processing capability and speed.

Figure 4:
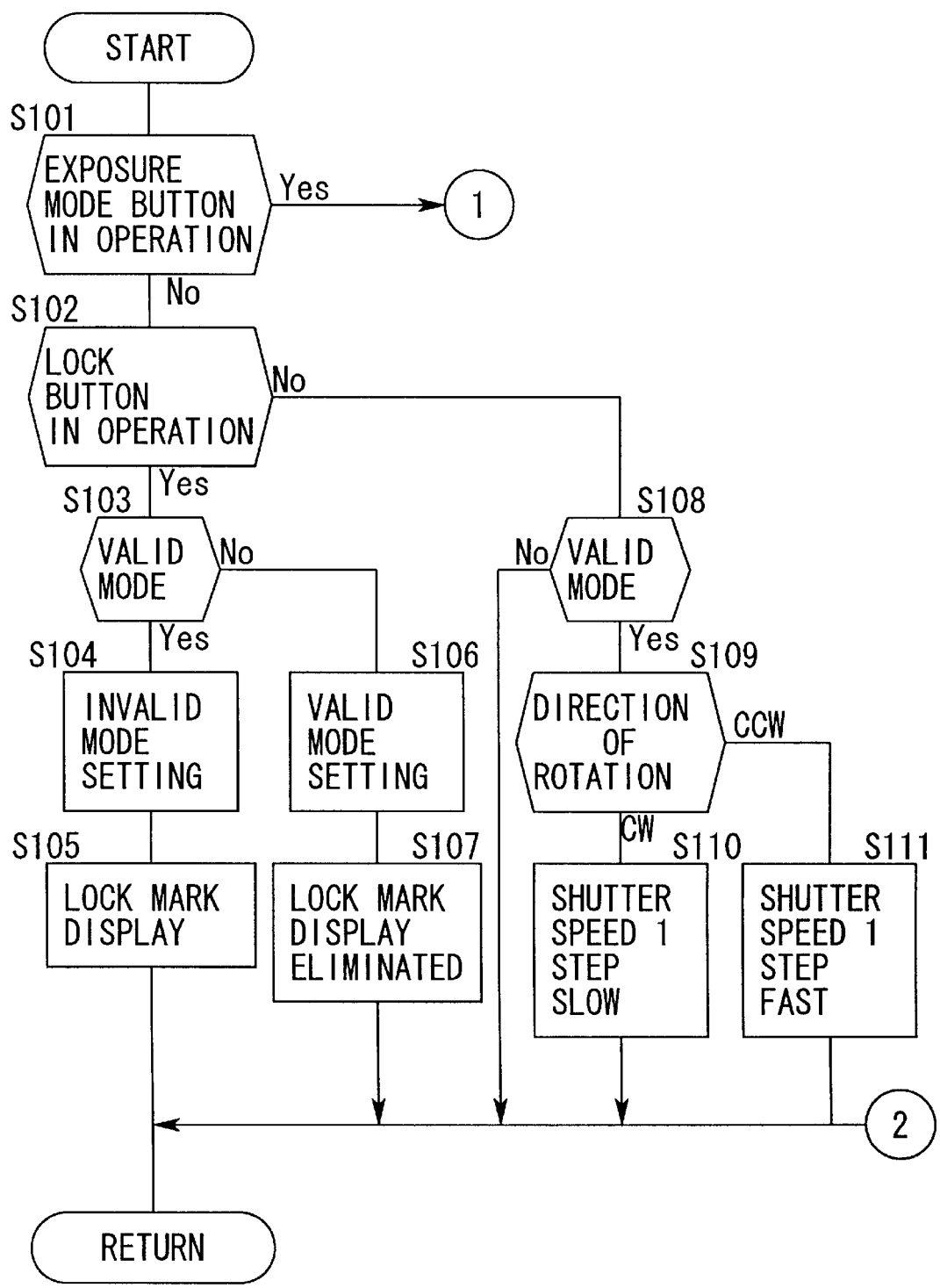
FIG. 4 is a flow chart showing the setting change process accomplished with a controller shown in FIG. 3.
Figure 5:
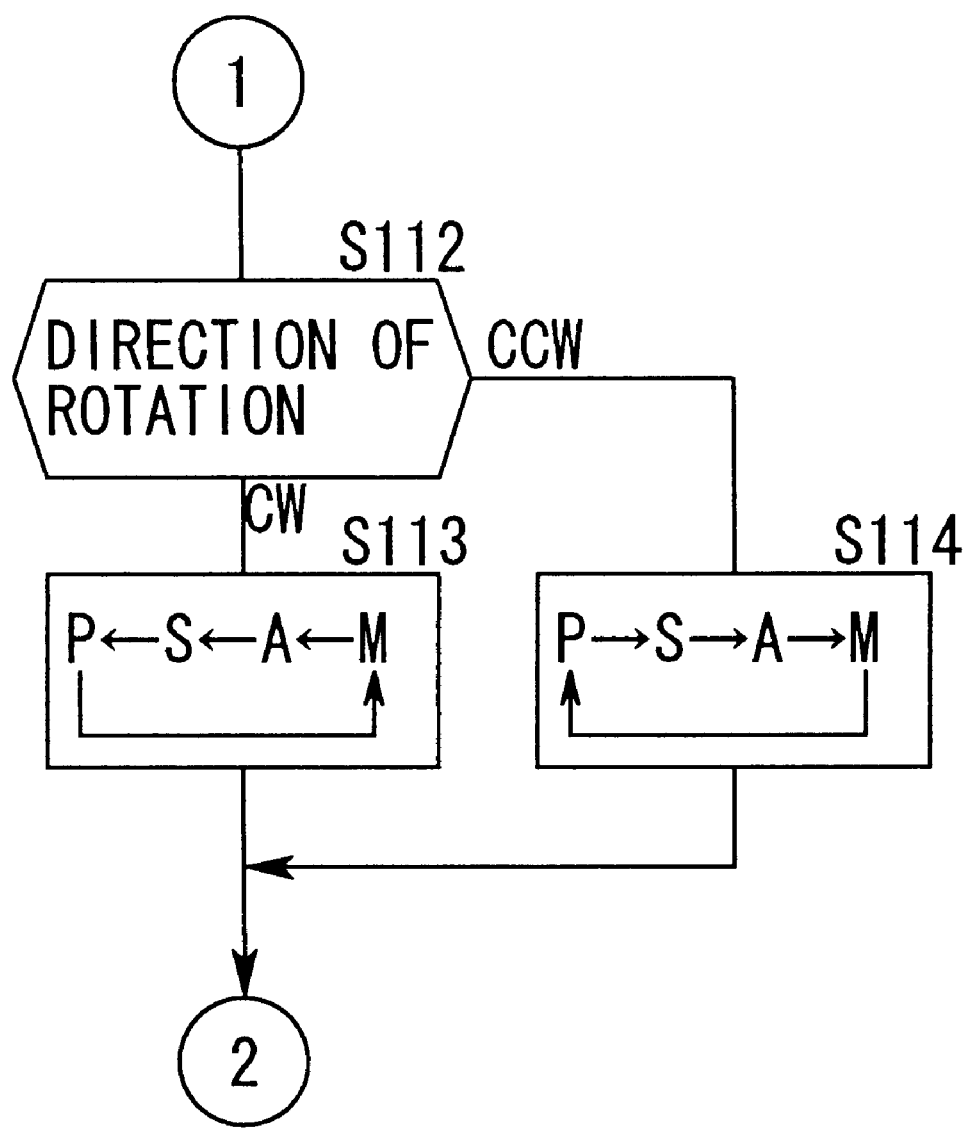
FIG. 5 is a flow chart showing a process for changing the exposure mode setting that follows from FIG. 4.

FIGS. 4 and 5 are flow charts showing the processes connected to the operations of the command dial 2, the lock button 5 and the exposure mode button 6. Every time the command dial 2 is clicked one time, the controller 10, as shown in the diagrams, carries out the processes. First, at step S101 (FIG. 4), it is determined whether the exposure mode button 6 is in operation by judging the ON or OFF condition of the switch 6s. If the operation of the exposure mode button 6 is not in process, the controller advances to step S102. At this step, it is determined whether the lock button 5 is in operation by judging the ON and OFF function of the switch 5s. If the operation continues, it is determined in step S103 whether the valid mode has been set before the lock button 5 is pressed. If the valid mode has been set, the controller advances to step S104 and changes the setting to the invalid mode. As a result, as shown in FIG. 2, the lock mark is displayed by the lock display segment 46 at step S105, and the process is completed. If the invalid mode has been set before the lock button 5 is pressed at step S103, the controller advances to step S106 and changes the setting to the valid mode. The lock mark display is thereby eliminated, as shown in FIG. 2, at step S107, and the process is completed. In addition, to distinguish the valid mode or the invalid mode settings, the data that distinguish the setting of either the valid mode or the invalid mode are stored in the memory 10m and when necessary can be read out.

At the time when it is determined that the lock button 5 is not in operation at step S102, it is determined whether the valid mode has been set before at step S108. When the valid mode is set, the rotation direction of the command dial 2 can be determined at step S109. Subsequently, if the rotation is in the clockwise direction (CW), the setting of the shutter speed is changed to a value one step slower at step S110, and if the rotation is in the counter clockwise direction (CCW), the setting of the shutter speed is changed to a value one step faster at step S111, thus completing the process. When it is determined that the invalid mode has been set before at step S108, the shutter speed is maintained, and the process is completed.

When the exposure mode button is under operation at step S101, the controller advances to step S112 shown in FIG. 5, where the rotation direction of the command dial 2 is determined. After the direction of the command dials is determined in S112, the exposure mode setting is changed in either S113 or S114. If the rotation is in the clockwise direction (CW), the exposure mode setting is changed at step S113 from the present mode to the next mode in the order of M mode, A mode, S mode, and P mode. If the rotation is in the counter-clockwise direction (CCW), the exposure mode is changed at step S114 from the present mode to the next mode in the reverse order of the above, thus completing the process.

According to the processes described above, each time the command dial 2 is rotated by one click while the lock button 5 is depressed, the valid mode and the invalid mode are switched alternately by the processes of step S103 through step S107. Subsequently, it is not possible to change the shutter speed setting during the invalid mode. However, when the exposure mode button 6 is depressed, the exposure mode is changed without fail regardless of whether the mode is valid or invalid.

Second Embodiment

Figure 6:
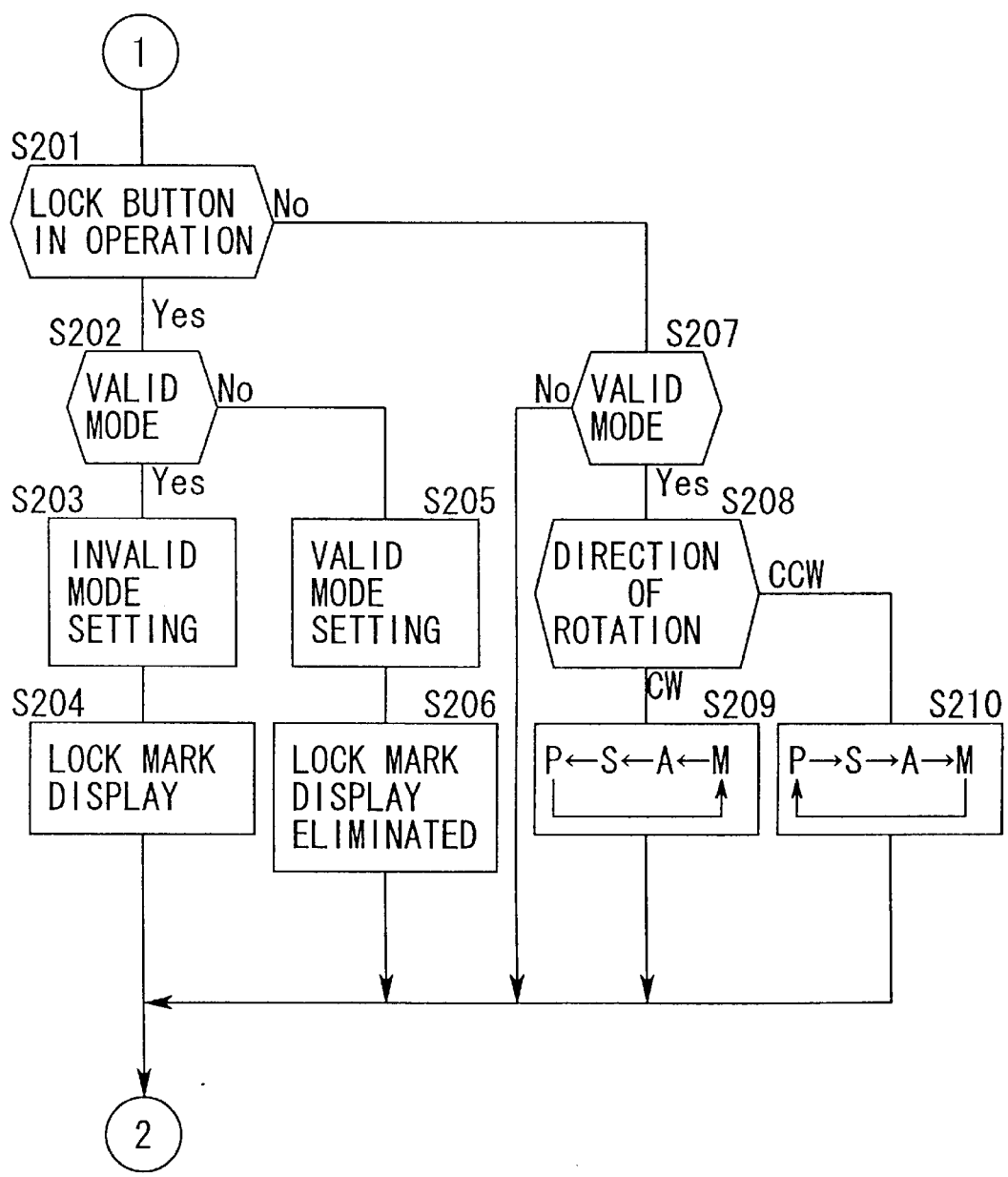
FIG. 6 is a flow chart showing an alternative process that follows that of FIG. 4, according to a second embodiment of the present invention.

A second embodiment according to the present invention is explained hereafter, with reference to FIG. 6. In the second embodiment, the process of the previous embodiment differs from that shown in FIG. 5. The identical codes are used for the common components for FIGS. 1–4. The differences are explained below.

In the present embodiment, when the command dial 2 is rotated by one click, while the exposure mode button 6 is in operation (when step S101 in FIG. 4 is determined affirmatively), a determination is made as to whether the lock button 5 is in operation at step S201. Subsequently, if the lock button 5 is in operation, a determination is made as to whether the valid mode concerning the setting change of the exposure mode is set. If the valid mode is set, the controller advances to step S203, and the setting is changed to the invalid mode. Therefore, the exposure mode setting cannot be changed. Subsequently, the lock mark is displayed at step S204 on the LCD display panel by the lock display segment 46 as shown in FIG. 2, thus completing the process. When the invalid mode is set at step S202, the controller advances to step S205. The setting is changed to the valid mode, and subsequently, the display of the lock mark, as shown in FIG. 2, is eliminated at step S206, thus completing the process.

When a determination is made that the lock button 5 is not in operation at step S201, a determination is made as to whether the valid mode is set at step S207. If the valid mode is set, the direction of rotation of the command dial 2 is determined at step S208. Subsequently, if the rotation is in the clockwise direction (CW), the exposure mode setting at step S209 is changed from the present mode to the next mode in the order of M mode, A mode, S mode, and P mode. If the rotation is in the counter-clockwise direction (CCW), the setting of the exposure mode at step S210 is changed from the present mode to the next mode in reverse of the order described above, thus completing the process. When the setting of the invalid mode is under way at step S207, the exposure mode is not changed, and the process is completed. In addition, even if the valid mode and the invalid mode are switched at step S203 or at step S205, the settings of the valid mode and the invalid mode (process at step S104 or step S106 in FIG. 4) relating to the shutter speed are not changed by the switching operation.

According to the processes described above, when the command dial 2 is operated while the lock button 5 is depressed, each time the command dial 2 is rotated by one click, the valid mode and the invalid mode for the setting change of the shutter speed are switched. The switching occurs in the same manner as in the previous embodiment. When the command dial 2 is operated while the lock button 5 and the exposure mode button 6 are depressed, the processes advance from step S101 (FIG. 4) to step S201 and to step S202, and at each time the command dial 2 is rotated by one click, the valid mode and the invalid mode relating to the exposure mode setting change are switched.

In addition, the second embodiment is applicable in additional situations. For instance, the operational component, which is capable of two types of operations (for example, two operations of different direction), is used in place of the operational component that accepts only the single operation (for example, depression operation) such as the exposure mode button 6. The setting of the first information is changed in accordance with the connection of the one operation and the operation of the command dial 2, and the setting of the second information is changed in accordance with the connection of the other operation and the operation of the command dial 2.

Figure 7:
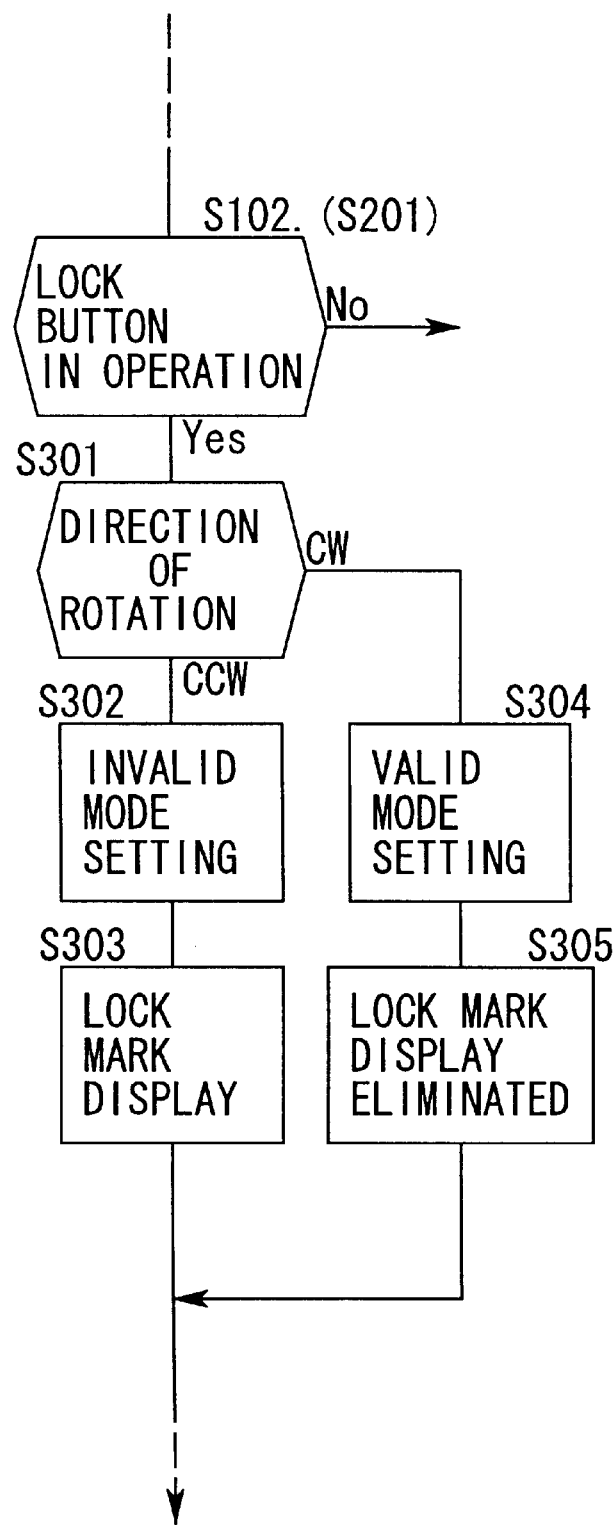
FIG. 7 is a flow chart showing variations of FIG. 4 and FIG. 6.

In a further embodiment of the present invention, it is also appropriate to change steps S103 through S107 shown in FIG. 4 or steps S202 through S206 to steps S301 through S305 shown in FIG. 7. In this embodiment, the direction of rotation of the command dial 2 is determined at step S102 shown in FIG. 4 and at step S201 shown in FIG. 6. At step S301, if the direction is counter-clockwise (CCW), the invalid mode is set at step S302, and the lock mark is displayed at step S303. If the direction is clockwise (CW), the valid mode is set at step S304 and the display of the lock mark is eliminated at step S305. According to the processes described above, regardless of whether the present setting is valid or invalid, it is possible to switch to the desired mode by operating the command dial 2 in the direction of the desired mode. Therefore, it is not necessary to operate the command dial 2 while confirming the display of the lock mark.

In yet another embodiment, step S101 is a process for determining whether one of the photometric mode buttons 7 through 9 is in operation. Steps S113, S114, S209 and S210 can be processes in response to the switch function with each button 7 through 9.

In each of the above-described embodiments, the same effect is produced. The above-described connected operation of the command dial 2 with one of the photometric mode button 7, the exposure correction button 8 or the sensitivity switch button 9 is carried out. It is also appropriate to carry out the same processes for the sub-command dial 3. In addition, in each embodiment described above, an explanation has been made for the case in which the related operation of the command dial 2 with the exposure mode button 6 is a simultaneous operation. However, it would also be appropriate to change the details of the connected operation. For example, the setting of the exposure mode could be changed when the command dial 2 is operated within an appropriate time (i.e., several seconds) after depressing the exposure mode button 6. As another example, the device according to the present invention can be applied to a system in which the shutter speed or the diaphragm value and the like are changed by a slide type switch or a push button type of operational component in place of the command dial 2.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

We claim:

1. A camera having an information setting apparatus that controls the setting of at least a first control information and a second control information, said information setting apparatus comprising:

a first operational component;

a second operational component distinct from said first operational component;

a setting change device that changes the setting of said first control information in response to an independent operation of said first operational component and that changes the setting of said second control information in response to a set of operations of said first and said second operational components; and a switching device capable of switching an operation of said setting change device between a setting change allowed condition and a setting change prohibited condition, wherein said switching device is effective for controlling only the setting of said first control information and the setting of said second control information is not prohibited in said setting change prohibited condition.

2. A camera having an information setting apparatus that controls the setting of at least first control information and a second control information, said information setting apparatus comprising:

a first operational component;

a second operational component distinct from said first operational component;

a setting change device that changes the setting of said first control information in response to an independent operation of said first operational component and that changes the setting of said second control information in response to a set of operations of said first and said second operational components;

a mode designating device that designates one of a valid mode and an invalid mode; and a setting change control device that allows the setting change of both said first and said second control information when said valid mode is designated and that prohibits the setting change of said first control information and allows the setting change of said second control information when the invalid mode is designated.

3. The camera according to claim 2, wherein said mode designating device comprises;

a third operational component distinct from said first and second operational components; and a designation change device that designates one of said valid mode and said invalid mode in response to a set of operations of said first operational component and said third operational component.

4. The camera according to claim 3, wherein said first operational component is rotatable and said designation change device alternately designates said valid mode and said invalid mode every time when said first operational component is rotated a specified amount while said third operational component is in operation.

5. The camera according to claim 3, wherein said first operational component is rotatable;

said designation change device designates said valid mode when said first operational component is operated in one direction while said third operational component is in operation; and said designation change device designates said invalid mode when said first operational component is rotated in a reverse direction opposite to said one direction while said third operational component is in operation.

6. A camera having an information setting apparatus that controls the setting of at least a first control information and a second control information, said information setting apparatus comprising:

a first operational component;

a second operational component distinct from said first operational component;

a third operational component distinct from said first and second operational components;

a mode designating device that designates one of a valid and an invalid mode in response to a set of operations of said first and said third operational components; and a control device that operates in accordance with said designated mode; wherein, when said designated mode is said valid mode, said control device changes the setting of said first control information in response to an independent operation of said first operational component and changes the setting of said second control information in response to a set of operations of said first and said second operational components, and when said designated mode is said invalid mode, said control device changes the setting of said second control information in response to said set of operations of said first and said second operational components and prohibits the setting of said first control information from changing in response to said independent operation of said first operational component.

7. A camera having an information setting apparatus for a camera that controls the setting of at least a first control information and a second control information, said information setting apparatus comprising:

an operation dial;

a function designating operational component;

a lock operational component;

a setting change device that changes the setting of said first control information in response to an independent operation of said operation dial and that changes said second control information in response to a set of operations of said operation dial and said function designating operational component;

a mode designating device that designates one of a valid mode and an invalid mode in response to a set of operations of said lock operational component and said operation dial; and a setting change control device that allows the setting change of both said first and said second control information when said valid mode is designated, and that prohibits the setting change of said first control information and allows the setting change of said second control information when said invalid mode is designated.

8. The camera according to claim 7, wherein said first control information is one of shutter speed and diaphragm value.

9. A camera having an information setting apparatus that controls the setting of at least a first control information and a second control information, said information setting apparatus comprising:

a first operational component;

a second operational component distinct from said first operational component;

setting change means for changing the setting of said first control information in response to an independent operation of said first operational component and changing the setting of said second control information in response to a set of operations of said first said second operational components; and switching means for switching an operation of setting change means between a setting change allowed condition and a setting change prohibited condition, wherein said switching means is effective for controlling only the setting of said first control information and the setting of said second control information is not prohibited in said setting change prohibited condition.

10. A camera having an information setting apparatus that controls the setting of at least a first control information and second control information, said information setting apparatus comprising:

a first operational component;

a second operational component distinct from said first operational component;

setting change means for changing the setting of said first control information in response to an independent operation of said first operational component and for changing the setting of said second control information in response to a set of operations of said first and said second operational components;

mode designating means for designating one of a valid mode and an invalid mode;

setting change control means for allowing the setting change of both said first said second control information when said valid mode is designated and for prohibiting setting change of said first control information while allowing setting change of said second control information when said invalid mode is designated.

11. The camera according to claim 10, wherein said mode designating means comprises:

a third operational component distinct from said first and second operational components; and designation change means for designating one of said valid mode and said invalid mode in response to a set of operations of said first operational component and said third operational component.

12. The camera according to claim 11, wherein said first operational component is rotatable and said designation change means alternately designates said valid mode and said invalid mode every time when said first operational component is rotated a specified amount while said third operational component is in operation.

13. The camera according to claim 11, wherein said first operational component is rotatable;

said designation change means designates said valid mode when said first operational component is operated in one direction while said third operational component is in operation; and said designation change means designates said invalid mode when said first operational component is rotated in a reverse direction opposite to said one direction while said third operational component is in operation.

14. A camera having an information setting apparatus that controls the setting of at least a first control information and a second control information, said information setting apparatus comprising:

a first operational component;

a second operational component distinct from said first operational component;

a third operational component distinct from said first and second operational components;

mode designating means for designating one of a valid and an invalid mode in response to a set of operations of said first and said third operational components; and control means for controlling setting change, in accordance with said designated mode; wherein, when said designated mode is said valid mode, said control means changes the setting of said first control information in response to an independent operation of said first operational component and changes the setting of said second control information in response to a set of operations of said first and said second operational components, and when said designated mode is said invalid mode, said control means changes the setting of said second control information in response to said set of operations of said first and second operational components, and prohibits the setting of said first control information from changing in response to said independent operation of said first operational component.

15. A camera having an information setting apparatus that controls the setting of at least a first control information and a second control information, said information setting apparatus comprising:

an operation dial;

a function designating operational component;

a lock operational component;

a setting change means for changing the setting of the first control information in response to an independent operation of said operation dial and for changing said second control information in response to a set of operations of said operation dial and said function designating operational component;

a mode designating means for designating one of a valid mode and an invalid mode in response to a set of operations of said lock operational component and said operation dial; and a setting change control means for allowing the setting change of both said first and said second control information when said valid mode is designated, and for prohibiting the setting change of said first control information and allowing the setting change of said second control information when said invalid mode is designated.

16. The camera to claim 15, wherein said first control information is one of shutter speed and diaphragm value.

17. An information setting method for a camera for controlling the setting of at least a first control information and a second control information using a first operational component, a second operational component distinct from said first operational component and a third operational component distinct from said first and second operational components, said information setting method comprising the steps of:

designating one of a valid mode and an invalid mode in response to a set of operations of said first operational component and said third operational component;

controlling setting change in accordance with said designated mode; wherein, when said designated mode is said valid mode, the setting of said first control information is changed in response to an independent operation of said first operational component and the setting of said second control information is changed in response to a set of operations of said first and said second operational components, and when said designated mode is said invalid mode, the setting of said second control information is changed in response to said set of operations of said first and said second operational components and the setting of said first information is prohibited from changing in response to said independent operation.

18. The information setting method according to claim 17, wherein said first operational component is rotatable and said valid mode and said invalid mode are alternately designated as said designated mode every time when said first operational component is rotated a specified amount while said third operational component is in operation.

19. The camera information setting method of claim 17, wherein said first operational component is rotatable;

said valid mode is designated when said first operational component is operated in one direction while said third operational component is in operation; and said invalid mode is designated when first operational component is rotated in a reverse direction opposite to said one direction while said third operational component is in operation.

* * * * *